United States Patent [19]

Dewing

[11] 4,420,168
[45] Dec. 13, 1983

[54] DEVICE FOR HANDLING REFUSE OR THE LIKE MATERIAL

[75] Inventor: Kenneth M. Dewing, Porterville, Calif.

[73] Assignee: Terra Bella Industries, Terra Bella, Calif.

[21] Appl. No.: 386,908

[22] Filed: Jun. 10, 1982

[51] Int. Cl.³ .............................................. B62B 1/00
[52] U.S. Cl. ............................... 280/43.1; 280/43.24; 248/129; 220/1 T
[58] Field of Search .............. 280/47.34, 47.21, 47.26, 280/63, 79.2, 43.24, 43, 43.1, 47.13 R; 220/1 T; 248/129, DIG. 7

[56] References Cited

U.S. PATENT DOCUMENTS

| D. 256,423 | 8/1980 | Bacskay | 220/1 T |
| 832,628 | 10/1906 | Schreffler | 280/47.26 |
| 3,904,218 | 9/1975 | Kostic | 220/1 T |

*Primary Examiner*—David M. Mitchell
*Assistant Examiner*—Joseph McCarthy
*Attorney, Agent, or Firm*—Huebner & Worrel

[57] ABSTRACT

A device which is for handling refuse or the like material; which has a container having a bottom surface provided with a pair of intersecting and downwardly open grooves, a pair of wheel recesses disposed at the opposite ends of one groove, and a mounting recess and a latch recess disposed at the opposite ends of the other groove; and which has a dolly having an arm extended through the one groove, elements in the mounting recess mounting the arm on the container for movement of the arm between an upper position and a lower position, an axle mounted on the arm and extended between the wheel recesses, a wheel mounted on the axle at each wheel recess, and a latch mounted on the arm at the latching recess and adapted to latch the arm in the lower position, the wheels being within the wheel recesses when the arm is in the upper position and being extended therefrom for rolling support of the device when the arm is in the lower position and the mounting elements serving resiliently to urge the arm toward the upper position and detachably to mount the dolly on the container.

15 Claims, 9 Drawing Figures

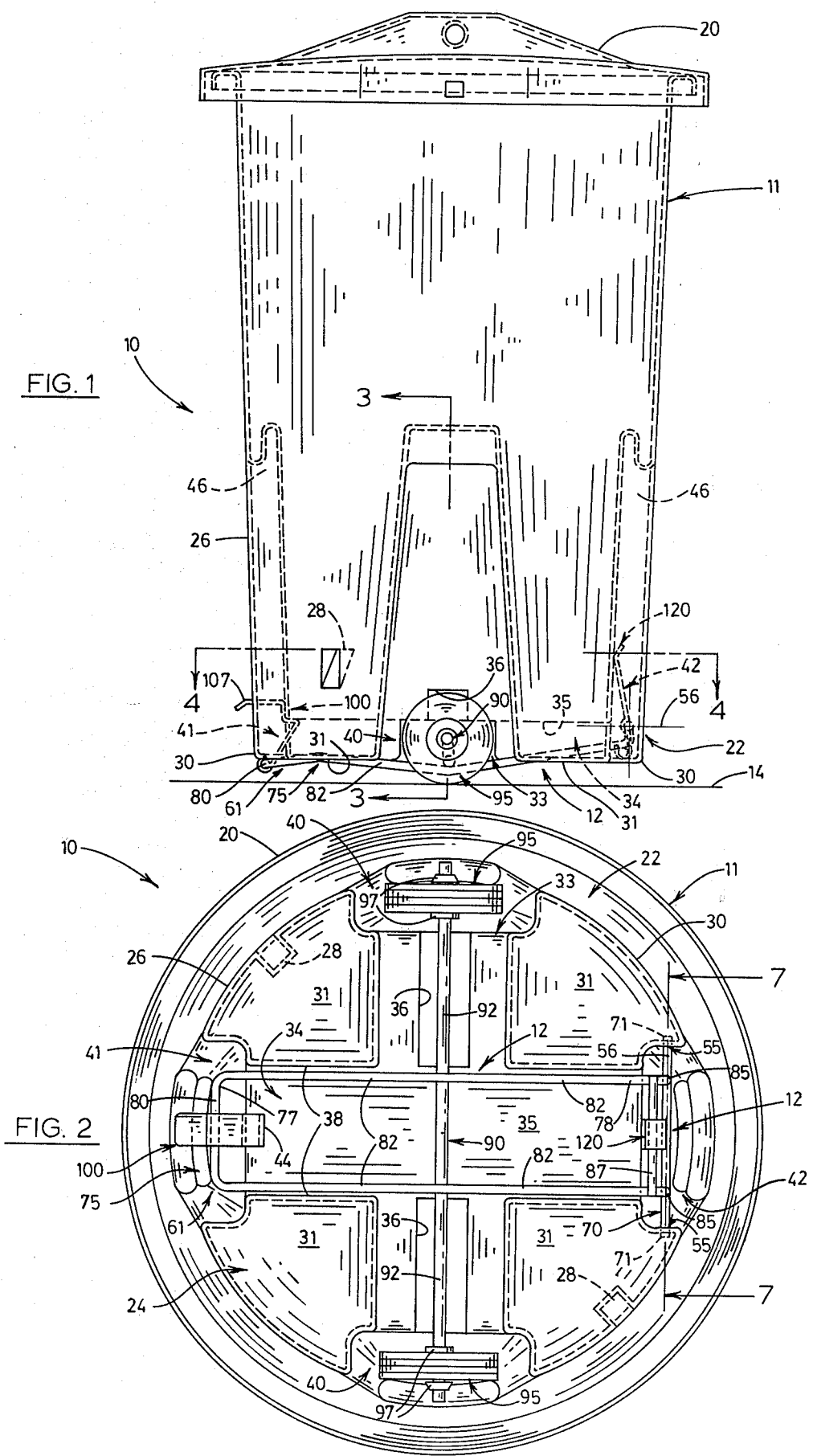

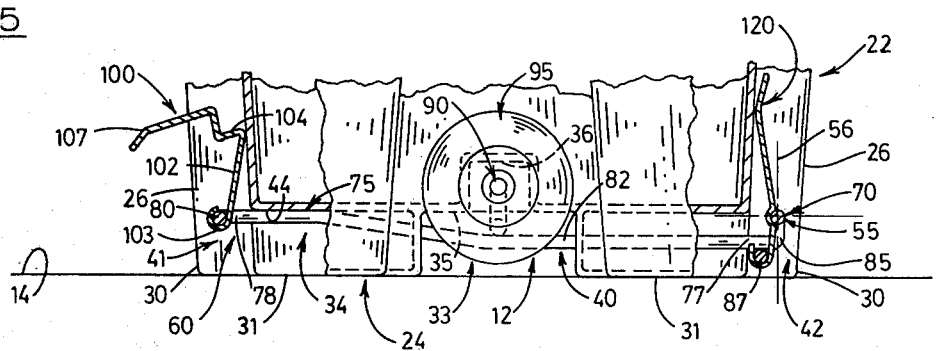
FIG. 5
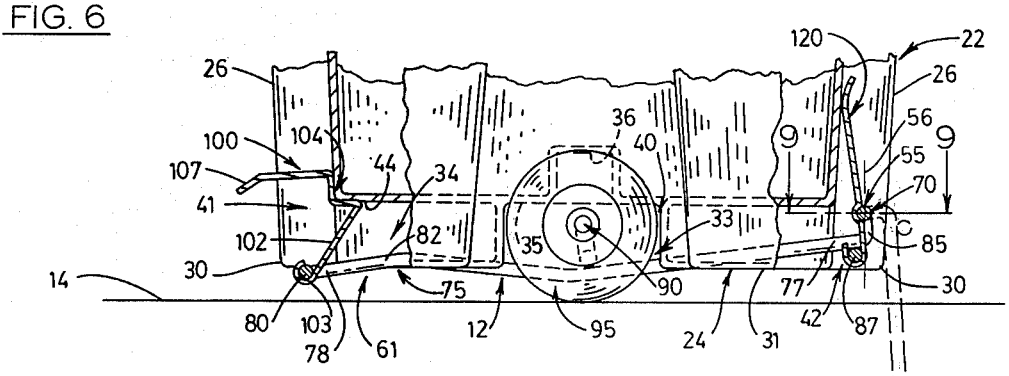
FIG. 6
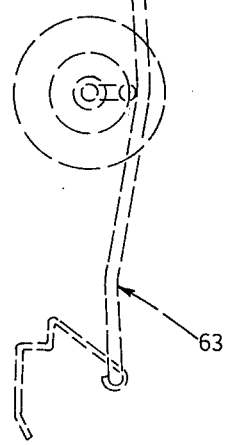

DEVICE FOR HANDLING REFUSE OR THE LIKE MATERIAL

BACKGROUND OF THE INVENTION

1. Field of the Invention

The present invention relates to a device for handling refuse or the like material, and more particularly to such a device having a container for such material mounted on wheels for convenient transport, the wheels being retractable.

2. Description of the Prior Art

It is known to provide a refuse container, which is of a size which can be manipulated by one person, with wheels to facilitate moving the container when it is loaded. Since such containers are subject to severe abuse, such wheels which project from the container are frequently broken from the container or otherwise damaged. It is, therefore, highly desirable to provide a refuse handling device having a container and wheels which are retractable to avoid damage and are conveniently extendable for transporting the container. It is, of course, desirable that such a device be not significantly more expensive, heavier, or less durable than prior art refuse containers lacking retractable wheels.

PRIOR ART STATEMENT UNDER 37 C.F.R. §1.97 AND §1.98

In conformance with 37 C.F.R. §1.97 and §1.98, the applicant states that he is not aware of any prior art, other than that described above, which is, in his opinion, relevant to the patentability of the present invention.

SUMMARY OF THE INVENTION

It is an object of the present invention to provide an improved device for handling refuse or the like material, which has a container and a selectively retractable and extendable transporting wheel.

Another object is to provide such a device which is not substantially heavier than a container lacking such wheels.

Another object is to provide such a device which is sufficiently sturdy to withstand the usual abuse given to refuse containers.

Another object is to provide such a device which has the above advantages and has a cost of production which is not significantly greater than the cost of production of a refuse container lacking a retractable wheel.

Another object is to provide such a device in which the wheel is convenient to extend when the container is loaded and in which the wheel is easily retracted to a protected position.

Another object is to provide such a container in which the necessary manipulations for extension and retraction of the wheel are simple and convenient.

Another object is to provide such a device in which the wheel and the elements for retracting and extending it are easily mounted on and dismounted from the container for replacement of the container or for the use thereof without the wheels.

A further object is to provide improved elements and arrangements thereof in a device which is for handling refuse or the like material in a container provided with a retractable and extendable wheel and which is fully effective in carrying out its intended purposes.

BRIEF DESCRIPTION OF THE DRAWINGS

FIG. 1 is an elevation of a device for handling refuse or the like material, which device embodies the principles of the present invention and is depicted with a dolly thereof in an extended position.

FIG. 2 is a bottom plan view of the container of FIG. 1 at a somewhat enlarged scale.

FIG. 5 is a fragmentary vertical section taken on line 5—5 of FIG. 4 and at the same scale, the dolly being depicted in the retracted position.

FIG. 6 is a fragmentary section taken from the position of line 6—6 of FIG. 4 and similar to FIG. 5, but with the dolly depicted in the extended position in solid lines and depicted in a dismounting position in long dash lines.

DESCRIPTION OF THE PREFERRED EMBODIMENT

Figure 4:
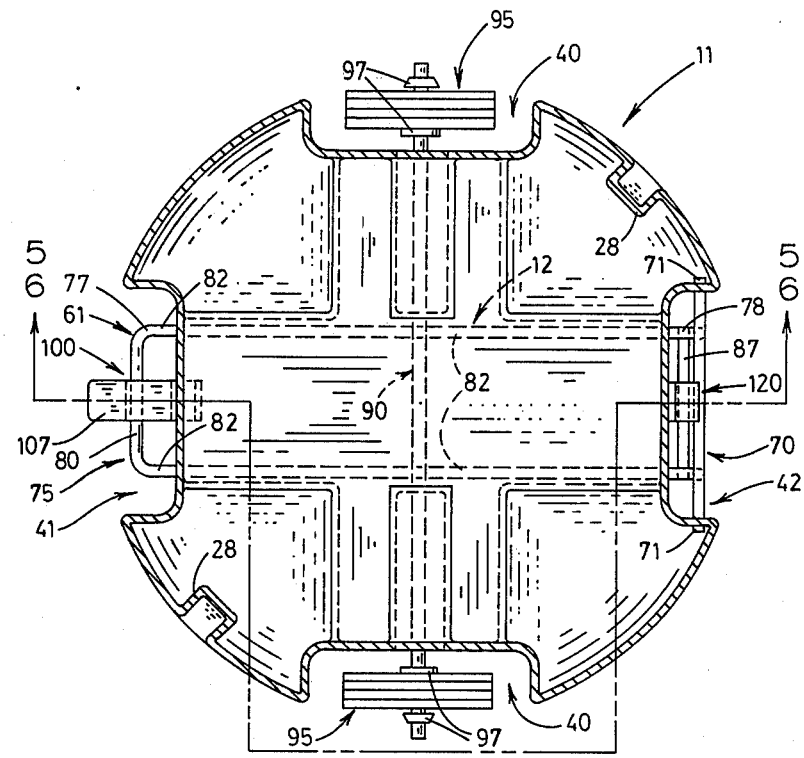
FIG. 4 is a fragmentary horizontal section of the device at the scale of FIG. 2 and taken on line 4—4 of FIG. 1.

Referring with greater particularity to the drawings, FIG. 1 shows a device, indicated generally by the numeral 10, which is for handling refuse or the like material and which embodies the principles of the present invention. The device consists of a container 11 and a dolly 12 and is depicted as rested on a floor or earth surface 14.

The container 11 is, in general, of a conventional configuration adapting it for use to receive refuse material and for stacking the similar containers when not being so used. The container has an open upper end provided with a detachable cover 20 and has a downwardly closed lower portion 22 which, in turn, has a bottom surface 24. The container has a circular, downwardly converging but generally upright exterior wall 26. This wall, typically, is provided with a pair of stacking lugs 28 extended within the container. The container is dimensioned so it can be manipulated, together with the dolly 12, by one person when the container is loaded with refuse. The container is, preferably, unitarily constructed of plastic materials and can be of any suitable configuration, except for the bottom surface which has a configuration specifically adapted for the practice of the present invention.

Figure 3:
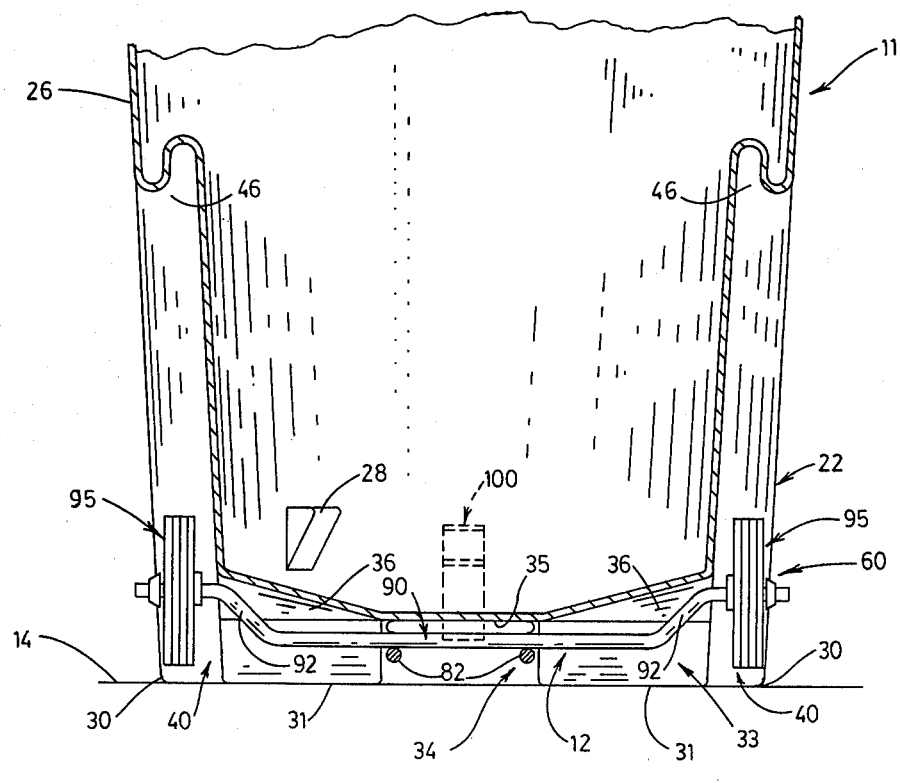
FIG. 3 is a fragmentary vertical section of the device at the scale of FIG. 2 and taken from the position of line 3—3 of FIG. 1, the dolly being depicted in a retracted position.

The bottom surface 24 of the container 11 is best shown in FIGS. 1 through 5 and, as viewed from beneath in FIG. 2, is of generally circular form having a peripheral edge 30 and four angularly spaced coplanar areas 31 which are the lowermost areas of the container and adapt it to rest flatly on the floor 14 as seen in FIG. 5. The lower surface defines a first or axle groove 33 and a second or arm groove 34. These grooves are downwardly open and are elongated so as to extend across the lower surface between opposed portions of the peripheral edge in intersecting right-angular relation, as best shown in FIG. 2. The grooves thus extend across and transversely of each other. The grooves terminate at the peripheral edge and have a relatively shallow rectangular cross section, as best shown in FIGS. 3 and 5, bounded upwardly by a planar portion 35 of the lower surface which is parallel to the areas 31. The dimensions and proportions of the grooves are substantially identical except that the axle groove has a pair of notches 36. The notches extend centrally along the axle groove and oppositely from its intersection with the arm groove. The notches extend upwardly of such planar portion, each notch becoming progressively deeper in a direction outwardly of the arm groove. It is evident that the arm groove has a pair of upright walls 38 which are spaced transversely of this groove a predetermined distance indicated by the numeral 39 in FIGS. 7 and 9.

The bottom surface 24 defines a pair of wheel recesses 40, a latch recess 41, and a mounting recess 42. These recesses are of substantially identical configuration and open downwardly of the surface and horizontally outwardly of the exterior wall 26. The wheel recesses are disposed at the opposite ends of the axle groove 33; the latch recess is disposed at one end of the arm groove 34; and the mounting recesses are disposed at the other end of the arm groove. The recesses are wider than the grooves in a direction transversely thereof, and each groove end opens into the corresponding recess. Each groove thus intersects the corresponding pair of recesses. It is evident that the recesses are disposed at the peripheral edge 30 of the bottom surface and that the pair of recesses corresponding to each groove are disposed in spaced relation and oppositely of the bottom surface 24. The bottom surface has a latch area 44, best shown in FIGS. 1 and 2, disposed on the portion 35 of this surface at the intersection of the arm groove 34 and the latch recess 41. It is apparent that the axle groove extends in opposite directions from the arm groove to the wheel recesses, and that the arm groove extends across the bottom surface from the mounting recess to intersect the latch recess. Each of the recesses 40, 41 and 42 extend upwardly along the exterior wall from the corresponding groove and merges upwardly with a hand hold recess 46. The hand hold recess opens outwardly of the side wall and terminates upwardly in a handgrip, best shown in FIG. 1. The hand hold recesses of the container are of substantially identical proportions and dimensions and each converges upwardly in a direction tangentially of the circular exterior wall so that the interior of this wall, which bulges inwardly at the recesses, is adapted for reception in the recesses of another container stacked in such interior.

The mounting recess 42 has a pair of upright, opposed end walls 50 which are spaced in a direction tangential to the circular exterior wall 26 of the container 11 a predetermined distance, which is indicated by the numeral 51 and is subsequently referred to as a "first predetermined distance". These walls are interconnected toward the center of the container by an upright side wall 53 of the recess, the recess being open oppositely of this wall. Each end wall has a circular opening 55 extended through it about a pivotal axis 56 which extends horizontally between the end walls approximately at the elevation of the portion 35. Each opening is circumscribed by an interiorly cylindrical surface of the corresponding end wall. This surface serves as a bearing 57, and it is apparent that the bearing is adjacent to the side wall of the recess and is aligned with the pivotal axis. It is also apparent that the arm groove 34 extends from the mounting recess in a direction generally radially of this axis.

The dolly 12 is mounted, in a manner subsequently to be described, on the container 11 for pivotal movement about the axis 56 between an upper position 60, which is shown in FIGS. 3 and 5, and a lower position 61 which is best shown in FIGS. 1 and 6. In both of these positions the dolly extends across the bottom surface 24 in adjacent relation thereto. Under conditions subsequently to be described, the dolly can pivot about this axis, in a direction from the upper position toward the lower position, beyond the lower position to a dismounting position 63. In the latter position, which is depicted in dash lines in FIG. 6 and in FIG. 9, the dolly extends in generally normal relation to the areas 31.

Figure 8:
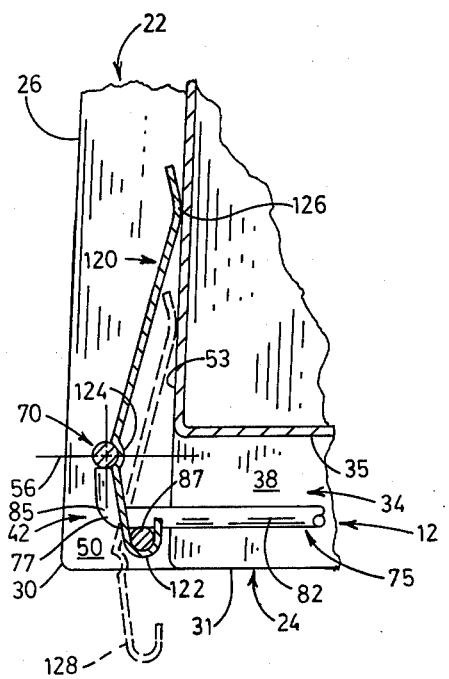
FIG. 8 is a fragmentary sectional view taken from the position of line 8—8 of FIG. 7 and at the same scale, a detached position of a clip being depicted in dash lines.
Figure 9:
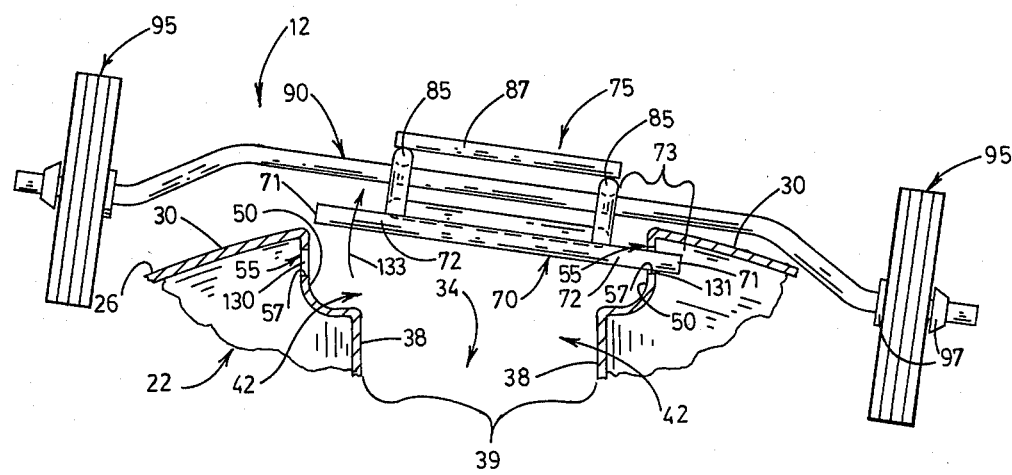
FIG. 9 is a fragmentary sectional view which is taken from the position of line 9—9 of FIG. 6 and at an enlarged scale, the dolly being depicted in the dismounting position and partially detached from the container.

The dolly 12 has a shaft 70, best shown in FIGS. 5 through 9. The shaft is disposed at the mounting recess 42 and is received in the bearings 57 when the dolly is mounted on the container 11. The shaft is loosely fitted in the bearings, as best shown in FIG. 9. As a result, the shaft not only is free to pivot about the axis and to slide therealong, but is able to swing in each of the bearings to a disposition at a substantial angle to the axis when the shaft is disengaged from the other of the bearings. The shaft has opposite ends 71 extended from the recess individually through the bearings for a predetermined distance which is indicated by the numeral 73 in FIGS. 7 and 9. This distance is referred to in the claims as a "second predetermined distance" and is substantially less than the first predetermined distance 51. The shaft thus has a pair of pivots 72 which are individually receivable in the bearings and are defined by the portions of the shafts toward its ends. It is apparent that each pivot can be disengaged from the corresponding bearing and, therefore, the container 11 by sliding the shaft along the axis 56 and transversely of the arm groove 34 a distance at least equal to such "second predetermined distance".

The dolly has an arm 75 fixedly mounted on the shaft 70 and disposed axially centrally thereof. The arm is thus mounted for movement with the arm pivotally about and slidably along the axis 56. The arm extends from the shaft in a direction radially of the axis. It is apparent that the arm is connected to the shaft for pivotal movement generally along a plane which is normal to the axis and which intersects the arm groove 34 so that the arm is aligned with this groove. The arm has an upper position, a lower position and a dismounting position corresponding to the positions 60, 61, and 63 of the dolly. In its upper position, the arm is wholly received in the arm groove, as shown in FIGS. 3 and 5. When the arm is in the lower position, as best shown in FIG. 6, only the portion of the arm toward the axis is received in this groove. However, in the dismounting position, the arm is disposed wholly outwardly of this groove. The arm is elongated radially of the shaft and has a pair of opposite ends 77 and 78. The end 77 is disposed at the shaft and the mounting recess 42. The opposite end 78 is disposed at the latch recess 41, when the dolly is in the upper position and is in the lower position, and is spaced from the latch recess when the dolly is in the dismounting position. The arm thus extends across and adjacent to the bottom surface 24 when the dolly is in these positions. In the two positions, it is evident that the opposite ends of the arm are disposed oppositely of the bottom surface at its peripheral edge 30 and that the arm extends transversely of a line between the wheel recesses 40. It is apparent that the shaft serves to mount the arm end 77 on the lower portion 22 of the container 11 for pivotal movement as the dolly moves between its positions 60, 61, and 63. It is also apparent that the shaft is mounted on such end of the arm and interconnects the container and the arm at such end thereof for movement between these positions.

The arm 75, preferably, is constructed as best shown in FIGS. 1, 2, and 3, of cylindrical metal rod material in an elongated, flat bottomed U-shape. The arm has an end length 80 of such material which forms the arm groove 34 when the dolly is in its positions 60 and 61. The arm has a pair of side lengths 82 of such material which extend individually from the opposite ends of the end length to the shaft 70. The side lengths are parallel to the walls 38 of the arm groove, one side length being adjacent to each wall. The width of the arm across the sides of these lengths toward these walls is slightly less than the distance 39 between the side walls so that movement of the arm transversely of the arm groove when the dolly is in such positions is limited to a "third predetermined distance" equal to the difference between the distance 39 and the width of the arm. This third distance is substantially less than the "second predetermined distance", referred to in the claims and indicated by the numeral 73 that the pivots 72 extend from the end walls 50 of the recess 42. It is apparent that, when the dolly is in its positions 60 and 61, movement of the arm transversely of the arm groove is limited by engagement of one of the side lengths with the corresponding wall to such third distance. Since the shaft must be moved transversely of this groove and along the axis 56 a distance at least equal to the "second predetermined distance" to withdraw the shaft from one of the bearings 57, it is evident that such disengagement cannot occur when the dolly is in or between its positions 60 and 61 because the arm engages one of the walls of the groove. Since the latch recess 41 is substantially wider in direction along the pivotal axis 96 than the groove and the groove is wider than such width of the arm across the side lengths, it is evident that the arm is spaced from each opposite end 71 of the shaft a distance greater than the "second predetermined distance" 73.

As best shown in FIG. 5, the side lengths 82 of the arm 75 are generally parallel to the portion 35 of the lower surface 22 when the dolly is in its upper position 60 and these lengths are wholly received in the arm groove 34 when the dolly 12 is in this position. These lengths are curved so that they are upwardly concave and are spaced farther from such portion at the axle groove 33. Referring to FIGS. 6 and 9, it is seen that each side length terminates at the arm end 77 in an upward, approximately ninety degree bend 85 to the shaft 70. The arm has a clip mounting rod 87 which extends parallel to the axis 56 across the side lengths. This rod is adjacent to the bends at the side thereof remote from the shaft and is disposed on the side lengths oppositely of the container 11. The length of the rod is substantially equal to the width of the arm in a direction transversely of the arm groove 34.

The dolly 12 has an axle 90 which is best shown in FIGS. 1, 2, and 3, and is fixedly mounted on the arm 75. The axle is constructed of cylindrical metal rod and extends transversely and oppositely from the arm centrally along the axle groove 33 into the wheel recesses 40. The axle has opposite end portions 92 which terminate within the wheel recesses. The dolly has a pair of substantially identical wheels 95 which, individually, are received in these recesses and are rotationally mounted on these end portions. Each wheel is retained on the corresponding end portion in any suitable manner, as by washers 97. It is evident that the axle and the wheels are mounted on the arm for movement therewith as the dolly moves between the upper position 60, the lower position 61, and the dismounting position 63. The wheels, typically, are of a relatively light-weight and well-known construction employing plastic material. It is apparent that the axle is extended between the wheels and across the arm. The axle is disposed between the container 11 and the side lengths 82 and upwardly engages the arm. Each axle end portion extends outwardly of the container and upwardly from the arm within the corresponding notch 36 so that the wheel axes are disposed approximately at the elevation of the planar container portion 35 when the dolly is in its lower position. As a result, the axle is disposed within the axle groove 33 and upwardly of the lowermost areas 31 of the bottom surface 24 when the dolly is in its upper position. As best shown in FIG. 5, the diameters of the wheels are such that they are wholly received in their respective recesses when the dolly is in its upper position and are thus retracted upwardly of the lowermost areas so that these areas can rest flatly on the surface 14. As best shown in FIGS. 1 and 6, the diameter of the wheels is also such that, when the dolly is in its lower position, the wheels extend from their respective recesses downwardly of the lowermost areas for rolling support of the container 11 on such surface. Preferably, the diameter of the wheels is such that the wheels extend a relatively short distance downwardly of the areas 31 when the dolly is in its lower position. It is apparent that, when the dolly is in its dismounting position, the axle and the wheels are disposed wholly outwardly of the axle groove and the wheel recesses.

The dolly 12 has a latch 100 best shown in FIGS. 2, 5, and 6. The latch is disposed at the latch recess 41 and is mounted on the end 78 of the arm 75 for movement therewith as the dolly moves between the upper position 60 and the lower position 61. The latch is disposed at the peripheral edge 30 of the bottom surface 24 and serves selectively to latch the dolly to the lower portion 22 of the container 11 when the dolly is in the lower position 61. The latch also serves selectively to unlatch the dolly from the container when the dolly is in the lower position for movement of the dolly from the lower position to the upper position. The latch, preferably, is unitarily constructed of resilient strip metal material. The latch includes a strut 102 having a lower end 103, which is fixedly connected to the center of the end length 80 of the arm 75, and an upper end is resiliently urged in the direction toward the latch area 44. When the dolly is in the upper position as shown in FIG. 5, the strut extends upwardly from the arm groove within the latch recess. The length of the strut between its ends is such that, when the dolly is in the lower position, as shown in FIG. 6, the upper end of the strut engages the latch area, thereby retaining the dolly in the lower position. The latch includes a treadle 107 which extends outwardly of the arm end 78 and from the strut in a direction away from the latch area. The treadle extends generally horizontally from the latch recess and the upper end of the strut to a point spaced substantially from the bottom surface of the container. As a result, the treadle is accessible from a point outwardly of such peripheral edge when the dolly is in the upper position and the container is rested by its lowermost areas 31 on the surface 14.

Figure 7:
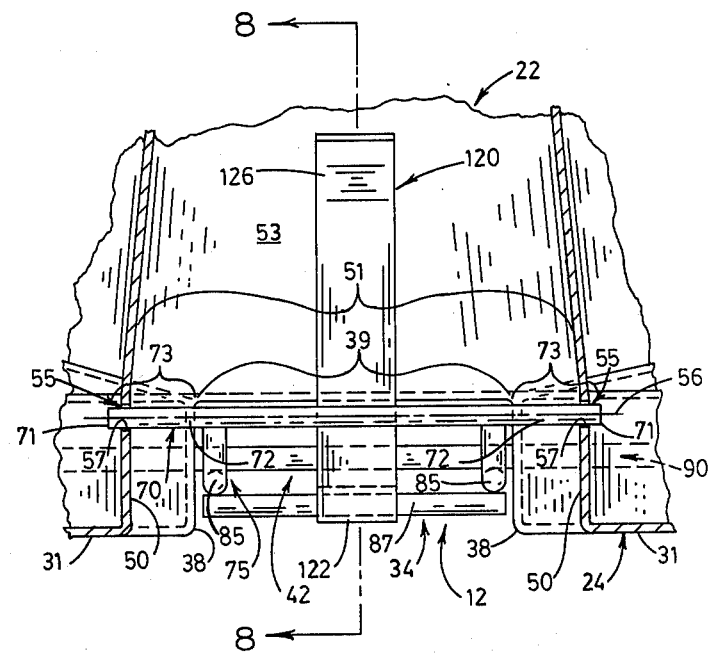
FIG. 7 is a fragmentary sectional view taken from the position of line 7—7 of FIG. 2 and at a further enlarged scale.

The dolly 12 has a resilient clip 120 which is best shown in FIGS. 7 and 8. The clip is detachably mounted on the end 77 of the arm 75 and extends therefrom into engagement with the container. As will be apparent, the clip serves resiliently to urge the dolly toward the upper position 60 from the lower position 61, serves to block movement of the dolly into the dismounting position 63, and is selectively releasable from the container and from the balance of the dolly so that the dolly is dismountable from the container. The clip is constructed of resilient strip metal material. The clip is vertically elongated and its lower end portion is a return bend 122 disposed at one side of the clip. The bend is upwardly open and conforms loosely to the clip mounting rod 87. Upwardly of the return bend, the clip has a semicircular bend 124 which is concave in a direction toward the opposite side of the clip and conforms loosely to the shaft 70. From the latter bend, the clip extends generally upwardly and in a direction away from the shaft toward and into engagement with the wall 53 of the mounting recess 42 at a point substantially below the pivotal axis 56. The upper end portion of the clip is a shallow bend 126 which bears against such wall and is concave in a direction oppositely thereof. The configuration of the clip is such that, when the clip is fitted to the arm with the return bend engaged with the mounting rod and the semicircular bend fitted to the shaft, the clip is constrained so that the shallow bend is resiliently urged against the recess wall and the semicircular bend is urged against the shaft. As a result, the portion of the shaft having the bends 122 and 124 is clipped to the arm 75 and moves therewith as the dolly moves between its upper position 60 and its lower position 61. The portion of the clip having the bend 126 extends into engagement with the container and exerts a resilient force thereon which urges the dolly from the lower position toward the upper position 60. It is apparent that this force increases as the dolly moves beyond the lower position in a direction from the upper position toward the lower position. As a result, when the clip is mounted on the arm, the clip blocks movement of the dolly in this direction substantially beyond the lower position and toward the dismounting position. However, when the clip is detached from the arm, the dolly is free to move to the dismounting position. It will be noted that, when the clip is constrained as above described, it presses the semicircular bend resiliently against the shaft so that the clip cannot move downwardly from the arm unless a substantial downward force is exerted on the clip when the clip is mounted on the arm. When the clip is mounted on the arm, upward movement of the clip is prevented by engagement of the return bend with the rod 87. As a result, the clip is retained on the arm unless it is deliberately urged downwardly with a force sufficient to disengage the semicircular bend from the shaft. When this bend is so disengaged, the clip can be withdrawn from the arm to a position 128, depicted in long dash lines in FIG. 8, in which the clip is free from the balance of the dolly and can be withdrawn downwardly therefrom.

It is apparent that the shaft 70, the arm 75, the rod 87, and the axle 90 are of skeletonized configuration and together with the lightweight wheels 95, result in the dolly 12 being economical to construct and being relatively light in weight compared to the weight of the container 11 when loaded with refuse material. As a result, a device 10, when loaded with refuse material, is not significantly heavier than the weight of a container which lacks wheels and which is similar to the container 11 and is similarly loaded. It is also apparent that the described dolly structure, except for the wheels and the detachable clip 120, lends itself to unitary construction, as by welding, so that the dolly is sturdy. The dolly, except for the wheels and the treadle 107, is substantially disposed within the grooves 33 and 34 and within the recesses 40, 41, and 42 when the dolly is in both its upper position 60 and its lower position 61 and is thus shielded from abuse. The treadle is of resilient material and not easily damaged. The wheels, the elements most easily damaged in prior art refuse containers having non-retractable wheels, are fully retracted within the wheel recesses when the dolly is in the upper position, which is the usual position of the dolly, and are then shielded from abuse.

OPERATION

The operation of the described embodiment of the subject invention is believed to be clearly apparent and is briefly summarized at this point. When the device 10 is in use, the dolly 12 is mounted on the container 11 with the clip 120 attached to the arm 75 so that the dolly and the container remain connected. When so used, the device is usually disposed with the dolly in its upper position 60, as best shown in FIGS. 3 and 5, the container being rested by its areas 31 on the surface 14 so that the device remains in a desired location to receive refuse material. When a substantial amount of such material has accumulated in the container and it is desired to move the container along the surface to another location for emptying, the treadle 107, which projects from the container as previously described, is pressed downwardly with the foot while the container is lifted slightly. The dolly is thereby brought into its lower position 61 and is automatically latched therein by the resilient action of the latch 100 which motivates the upper end 104 of the strut 102 to engage the latch area 44. When the dolly is in this position and the container is held in an upright position, as shown in FIG. 1, the container and the refuse material therein rest on the wheels. The device and such material are then easily rolled about on such surface. Since the wheels extend a relatively short distance from the bottom surface, it is apparent that tilting the container slightly from its upright position will engage one or more of the areas 31 with the floor or earth surface so that the device will remain in such slightly tilted position indefinitely. It is, therefore, not necessary to return the dolly to its upper position if the device is left unattended temporarily while being transported with the wheels extended. The dolly, as described above, adds little to the overall weight of the container when loaded with refuse material. As a result, when the container is loaded, the device can be lifted and inverted for emptying without significantly more effort than is required for a prior art container which lacks the dolly, bit is of similar capacity and is similarly loaded. When the container is emptied, or at any other time, if desired, the dolly is returned to its upper position simply by moving the treadle away from the latch area 44 to disengage the end 104 of the strut 102 from this area. The arm 75 is thus unlatched from the container and the dolly is automatically returned to its upper position by the resilient action of the clip.

If it is desired to dismount the dolly 12 from the container 11 for any reason, the device 10 is preferably inverted for convenient access to the dolly. However, in the subsequent description, for consistency with the foregoing description and for convenience in referring to the drawings, the device is described as if it were in the usual upright position for the reception of refuse material. Initially, the clip 120 is detached from the arm 75 by forcibly pressing the clip downwardly to the position 128 shown in FIG. 8, the resilient construction of the clip allowing it to bend sufficiently for the semicircular bend 124 to escape from the rod 87. After the clip attains this position, it is easily withdrawn downwardly from the arm and set aside. With the clip detached, pivotal movement of the dolly to the dismounting position 63, in which the dolly is outward of the grooves 33 and 34, is no longer blocked. The dolly is then pivoted to the dismounting position, as shown in FIGS. 6 and 9. The arm, the axle 90, and the wheels 95 are then free to move, together with the shaft 70, in a direction along the axis 56 since none of these elements engages the bottom surface 24 of the container, as at the axle groove 33 and the arm groove 34 or at the recesses 40 when the dolly is in the dismounting position. Specifically, the side lengths 82 of the arm 75 do not engage the upright walls 38 of the arm groove, thereby freeing the dolly for movement transversely of this groove a greater distance than the above described third predetermined distance to which movement of the arm is limited by engagement with these walls. This greater distance is, of course, also greater than the second predetermined distance 73 which the pivots 72 extend through the bearings 57 from the mounting recess 42. As a result, the shaft 70 can be slid along the axis toward one of these bearings, indicated by the numeral 130 in FIG. 9, to withdraw from the other of these bearings, which is indicated by the numeral 131, the one of the ends 71 of the shaft corresponding to such other bearing. The one of the pivots 72 corresponding to such one end of the shaft is thereby released from the container to disconnect the dolly therefrom. The shaft, which is loosely received in the bearings as before stated, is then swung, as indicated by the arrow 133, in the one bearing by moving such one end of the shaft away from the wall 53 of the mounting recess 42 until such shaft end is disposed outwardly of the one of the end walls 50 of this recess opposite such one of the bearings. The dolly is then withdrawn from this bearing in a direction along the shaft toward the end thereof originally received in such other of the bearings. The dolly 12 is thus dismounted from the container 11. The dolly is remounted on the container by reversing the dismounting procedure, the final steps in remounting being to place the clip 120, in the position 128 depicted in dash lines, and to press the clip upwardly into the position depicted in solid lines. The clip is thereby mounted on the arm so that the dolly is retained on the container.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A device for handling refuse or the like material, the device comprising
   A. a container having a bottom surface defining a downwardly open recess therein and having a lowermost area,
   B. an arm extending across the surface and having opposite ends,
   C. means mounting one of the ends on said surface for pivotal movement of the arm before a predetermined upper position and a predetermined lower position,
   D. means mounted on the other of the ends selectively for latching the arm to the container when the arm is in the lower position for retention of the arm therein, and
   E. a wheel received in the recess and mounted on the arm for movement therewith between said positions, the wheel extending downwardly of the lowermost area when the arm is in the lower position for rolling support of the container, and the wheel being disposed upwardly of such area in the recess when the arm is in the upper position.

2. The device of claim 1 further comprising means for resiliently urging the arm toward its upper position.

3. The device of claim 1 wherein the recess is one of a pair of such recesses disposed peripherally and oppositely of the bottom surface; wherein the wheel is one of a pair of such wheels individually received in the recesses, wherein the bottom surface defines a first downwardly open groove therein extended between the recesses and the bottom surface defines a second downwardly open groove therein extended transversely across the first groove; wherein the arm is aligned longitudinally with the second groove and is received therein upwardly of the lowermost area when the arm is in the upper position; and wherein the device includes an axle extended between the wheels and across the arm, the wheels being mounted on the axle for rotation of the wheels relative to the arm and the axle being mounted on the arm for movement with the arm between said positions thereof and being received in the first groove upwardly of the lowermost area when the arm is in the upper position.

4. The device of claim 3 wherein said other of the ends of the arm is disposed peripherally of the bottom surface and the latching means extends from said end outwardly of said surface for access to said means for latching the arm in the lower position when the arm is in the upper position and the container is rested on the lowermost area.

5. A device for handling refuse or the like material, the device comprising:
   A. a downwardly closed container having
      (1) a bottom surface having a lowermost area adapted to rest on a supporting surface and having a circumscribing peripheral edge, and
      (2) a pair of recesses disposed oppositely of the bottom surface and at said edge thereof, each recess opening downwardly through said surface; and
   B. a dolly mounted on the container and having
      (1) a pair of wheels individually received in the recesses,
      (2) an element which is disposed adjacent to the bottom surface and which rotationally mounts the wheels, the element being connected to the container for movement between an upper position of the element, in which the wheels are retracted upwardly of the lowermost area within the corresponding recesses, and a lower position, in which the wheels are extended from the corresponding recesses downwardly of said area for rolling support of the device on the support surface; and (3) means disposed at such peripheral edge and accessible outwardly thereof when said area is rested on the supporting surface selectively for latching the element to the container to retain the element in the lower position thereof and for unlatching the element from the container when the element is in the lower position for movement of the element to the upper position thereof.

6. The device of claim 5 wherein said element of the dolly is an arm extending across bottom surface transversely of a line between the recesses and having a pair of opposite ends disposed at the peripheral edge and oppositely of the bottom surface; wherein the latch means is disposed at one of said opposite ends; and wherein the dolly includes means disposed at the other of said opposite ends and interconnecting the arm and the container thereat for pivotal movement of the arm between said positions.

7. The device of claim 6 wherein the dolly includes means for urging the arm resiliently toward the upper position.

8. The device of claim 6 wherein the interconnecting means is mounted on said opposite end of the arm and is selectively releasable from the container for dismounting the dolly therefrom.

9. The device of claim 8 wherein
A. the bottom surface defines a downwardly open, elongated groove extending thereacross and has a pair of walls spaced transversely of the groove;
B. the arm extends along the groove and is received therein when the arm is in the upper position and in the lower position so that the movement of the arm transversely of the groove is limited to a predetermined distance by engagement of the arm with one of the walls thereof; and
C. the interconnecting means comprises
(1) a pivot fixedly connected to the arm and received in the container for slidable movement in a direction transversely of the groove, the pivot being disengagable from the container by movement in said direction a distance greater than said predetermined distance, so that, when the arm is in the upper position and in the lower position, movement of the arm in said direction engages the arm with one of said walls before the pivot disengages from the container, and
(2) resilient means having one portion detachably mounted on the arm and another portion extended therefrom into engagement with the container for resiliently urging the arm toward the upper position and for blocking movement of the arm in a direction from the upper position toward the lower position substantially beyond the lower position, so that the dolly is retained on the container when said means are mounted on the arm and so that, when said means are detached from the arm, the arm is pivotable in said direction beyond the lower position and outwardly of the groove, thereby freeing the arm for movement in said direction transversely of the groove a distance greater than said predetermined distance to release the pivot from the container for dismounting the dolly therefrom.

10. A device for handling refuse or the like, the device comprising:
A. a container having a mounting recess defined by a pair of upright, opposed end walls at the recess and by an upright side wall thereat, the end walls being spaced a first predetermined distance and having individual bearings aligned along a pivotal axis extending between said walls and the side wall extending between the end walls adjacent to the bearings; and the recess being open oppositely of the side wall; and
B. a dolly mounted on the container and having
(1) a shaft loosely received in the bearings for pivotal movement about the axis and slidable movement therealong, the shaft having opposite ends individually extended through the bearings from the recess a second predetermined distance which is substantially less than the first predetermined distance, and
(2) an arm mounted centrally on the shaft and spaced from the opposite ends thereof a distance greater than the second predetermined distance so that, the dolly is dismountable from the container by sliding the shaft along the axis toward one of the bearings to withdraw one end of the shaft from the other of the bearings, swinging the shaft in said one bearing by moving said one end of the shaft away from the side wall until said one end is disposed outwardly of the end wall opposite said one bearing, and withdrawing the shaft from said one bearing in a direction along the shaft toward said one end thereof.

11. The device of claim 10 wherein:
A. the container has a bottom surface having a lowermost area and the recess is disposed peripherally of the surface, the surface defining a downwardly open arm groove extended from the recess across the surface in a direction generally radially of the pivotal axis, a downwardly open wheel recess, and a downwardly open axle groove extending from the arm groove to the wheel recess;
B. the arm extends from the shaft in a direction generally radially of the axis and is connected to the shaft for pivotal movement about the axis generally along a plane intersecting the arm groove, the arm being pivotable between an upper position of the arm, in which the arm is received in the arm groove upwardly of said area, and a lower position of the arm; and
C. the dolly has an axle mounted on the arm and extended therefrom along the axle groove toward the wheel recess and has a wheel mounted on the axle and disposed at the wheel recess, the axle and the wheel moving with the arm between the upper position thereof and the lower position thereof and being disposed on the arm so that, when the arm is in the upper position, the axle is received in the axle groove upwardly of said area and the wheel is received in the wheel recess upwardly of said area and so that, when the arm is in the lower position, the wheel extends from the wheel recess downwardly of the bottom surface.

12. The device of claim 11 wherein the arm is connected to the shaft for pivotal movement about the axis in a direction from the upper position toward the lower position beyond the lower position to a dismounting position of the arm in which the arm is disposed wholly outwardly of the arm groove and the wheel is disposed wholly outwardly of the wheel recess, so that the arm and the wheel are movable with the shaft in a direction along the pivotal axis and do not engage the bottom surface at said groove and at said recess as the shaft is slid along said axis to dismount the dolly from the container.

13. The device of claim 12 wherein the dolly includes resilient means having a first portion detachably mounted on the arm for pivotal movement therewith as the arm moves between the upper and the lower positions and having a second portion extended from the first portion toward the side wall of the mounting recess, said means being configured so that, when the first portion is mounted on the arm, the second portion is resiliently urged into engagement with the side wall for resiliently urging the arm toward the upper position and for restraining the arm against movement beyond the lower position toward the dismounting position and so that the arm is movable into the dismounting position when the first portion is detached from the arm.

14. The device of claim 11 wherein the bottom surface of the container defines a latch recess disposed peripherally of the surface and spaced from the mounting recess and the arm groove extends across the surface from the mounting recess to intersect the latch recess; wherein the arm has an end disposed at the latch recess when the arm is in the upper position and in the lower position; wherein the dolly includes latch means mounted on said end for movement with the arm between said positions for latching the arm to the container in the lower position and for unlatching the arm from the container when the arm is in the lower position for movement of the arm therefrom toward the upper position.

15. The device of claim 14 wherein the latch recess extends upwardly from the arm groove; the bottom surface has a latch area disposed at the intersection of the latch recess and the arm groove; the latch recess extends upwardly from the arm groove; and wherein the latch means comprises:

A. a resilient strut having one end fixedly connected to said end of the arm and an opposite end spaced upwardly of said one end, the strut being configured so that said opposite end is resiliently urged in a direction toward the latch area and extends upwardly from the arm groove within the latch recess when the arm is in the upper position; and B. a treadle extended from the strut outwardly of the latch recess in a direction away from the latch area so that, when the arm is in the upper position, depressing the treadle urges the arm toward the lower position and said opposite end moves to engage the latch area and to latch the arm to the container in the lower position and so that, when the arm is latched in the lower position, movement of the treadle away from the latch area disengages said opposite end from the latch area to unlatch the arm from the container for movement of the arm toward the upper position.

* * * * *